No. 707,842. Patented Aug. 26, 1902.
G. C. HAWKINS & H. L. FLINT.
ELECTRIC FAN.
(Application filed Mar. 29, 1901.)
(No Model.)
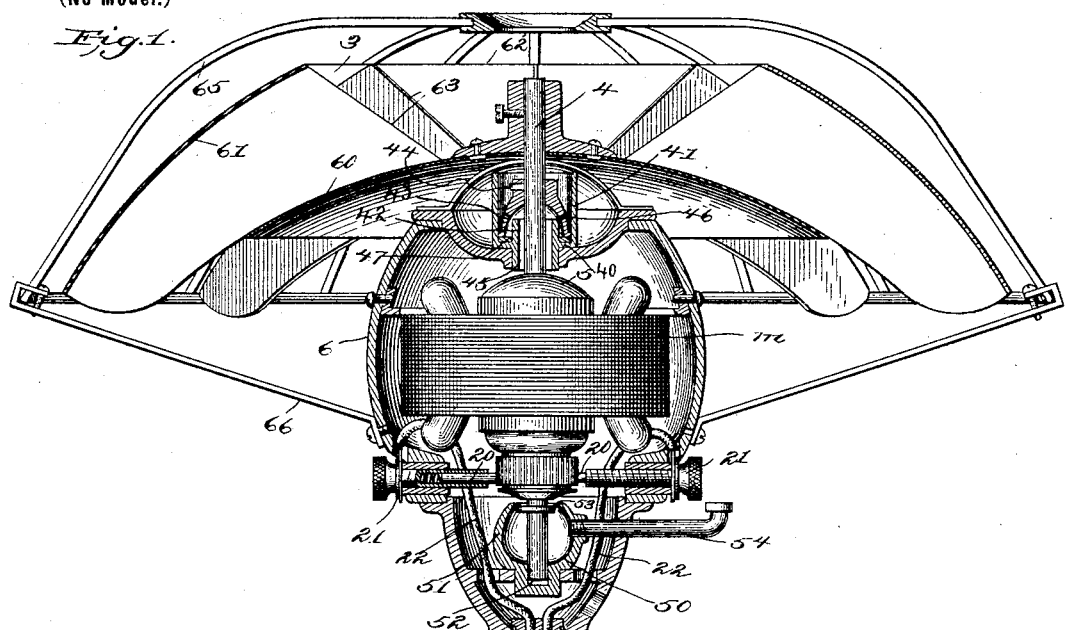
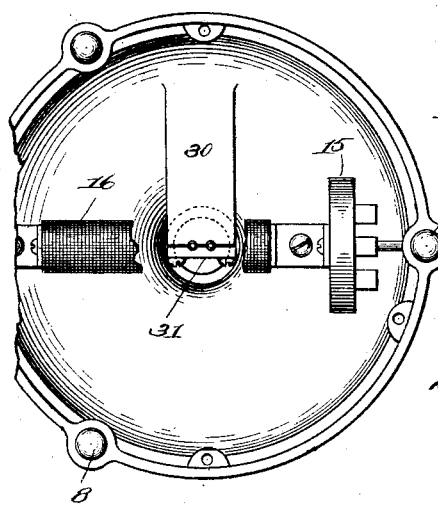
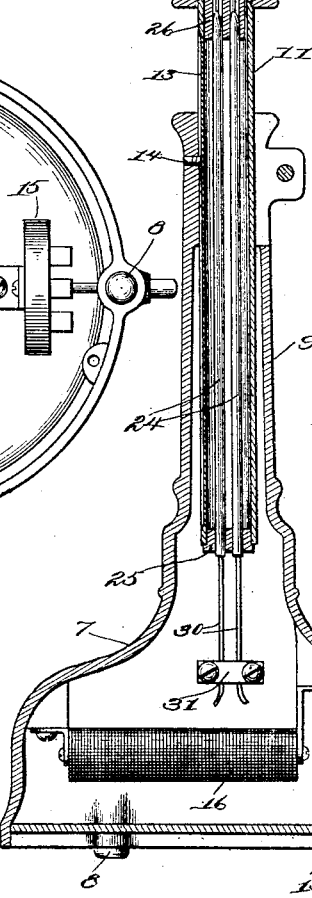
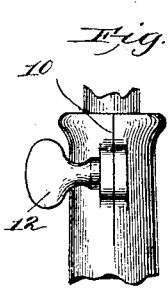
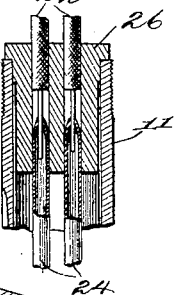
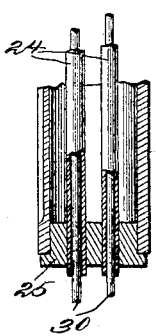
Witnesses,
Inventors,
Gardner C. Hawkins,
Herbert L. Flint,
attys.

UNITED STATES PATENT OFFICE.

GARDNER C. HAWKINS, OF BOSTON, AND HERBERT L. FLINT, OF CAMBRIDGE, MASSACHUSETTS, ASSIGNORS TO BOSTON ELECTRIC HEATING AND POWER COMPANY, OF PORTLAND, MAINE, AND BOSTON, MASSACHUSETTS, A CORPORATION OF MAINE.

ELECTRIC FAN.

SPECIFICATION forming part of Letters Patent No. 707,842, dated August 26, 1902.

Application filed March 29, 1901. Serial No. 53,492. (No model.)

*To all whom it may concern:*

Be it known that we, GARDNER C. HAWKINS, a resident of Boston, in the county of Suffolk, and HERBERT L. FLINT, a resident of Cambridge, in the county of Middlesex, State of Massachusetts, citizens of the United States, have invented an Improvement in Electric Fans, of which the following description, in connection with the accompanying drawings, is a specification, like characters on the drawings representing like parts.

Our invention has for its object the production of a novel electric fan which is especially adapted for use as a desk-fan; and it comprises a standard consisting of a fixed base portion and a motor-frame supported in said base for vertical adjustment. The motor-frame carries a motor having a vertically-arranged armature-shaft, to the upper end of which is attached a fan having a series of radially-arranged passages therethrough, which passages are preferably arranged at an angle to the axis of rotation of the fan.

As the fan is operated the air is sucked in through the center thereof and forced radially downwardly through the said passages. The vertical adjustment of the motor-frame and fan with relation to the base enables the fan to effect a greater or smaller area.

The base of the fan incloses a suitable switch, and extensible electrical connections between the switch and the motor are inclosed in a standard, so that the motor may be operated at any adjusted position of the motor-frame.

The armature-shaft is supported by a step-bearing, the said step-bearing being situated between the fan and the motor, and it is of such a construction as to prevent the oil with which the bearing is lubricated from working through the bearing down onto the armature. The lower end of the shaft is provided with a suitable centering device in the nature of an oil-cup, and suitable means are provided for preventing the oil in the oil-cup from working up onto the armature.

In the drawings, Figure 1 is a vertical sectional view of our improved fan. Fig. 2 is a bottom plan view. Fig. 3 is a detail of the adjustable connection between the base and the motor-frame. Figs. 4 and 5 are details showing the extensible electrical connections between the base and the motor-frame.

The fan is designated generally by 3, its construction being hereinafter described, and it is made fast to the upper end of the vertically-arranged armature-shaft 4, the said shaft carrying the armature 5 of a suitable motor which is mounted in the motor-frame 6. Said motor-frame 6 comprises part of a suitable standard which supports the fan and which is adapted to be placed upon a desk or table, the other portion of the standard comprising the base 7, having the usual rubber rests 8. The base 7 is provided with an upwardly-extended neck 9, which is split at its upper portion, as at 10, and the motor-frame 6, which may be of any suitable construction, is provided with the downwardly-extended hollow stem 11, which telescopes into the neck 9 of the base 7, the said stem being held in its proper adjusted position by means of the clamping-screw 12. In order to prevent the stem from turning in the neck 9, we may, if desired, provide the said stem with a groove 13, in which a pin or set-screw 14 in the neck 9 slides. The base incloses a suitable controller, shown as a three-point switch 15 and a resistance-coil 16, the switch being so arranged that the resistance-coil 16 may be thrown into the circuit or cut out therefrom, according as the motor is to be run at half-speed or at full speed. Inasmuch as the motor-frame is vertically adjustable with reference to the base 7, it is necessary to provide some form of extensible electrical connections between the switch 15 and the motor $m$, so that the motor may be operated at any adjusted position of the motor-frame. For convenience sake we prefer to carry the conductors or connections between the motor and the switch down through the hollow stem 11 of the motor-frame, and, as illustrated, the brushes of the motor are designated by 20, said brushes being yieldingly mounted in the adjusting-screws 21, which are carried by the motor-frame. The adjusting-screws 21 are in the nature of terminals and have connected thereto the wires 22, which wires are in turn connected to the extensible electrical conductors which pass down through the stem 11 of the fan. One convenient way of constructing these extensible conductors is to support in the interior of the hollow stem 11 the metallic tubes 24, the said tubes preferably extending the length of the stem and being supported at their lower ends in the block of insulating material 25 and at their upper ends in a block 26, also of suitable insulating material. The ends of the wires 22 are inserted into the insulating material 26 and have their lower ends stripped of the insulation, as seen in Fig. 4, and the tubes 24 are electrically connected in the plug 26 to the wires 22 in some suitable way, preferably by flattening the ends of the tubes, as shown in Fig. 4. The base 7 supports the wires 30, the said wires being held by a suitable insulated clamp 31 and being connected to the switch in any usual way. The upper ends of the wires telescope into the tubes 24, the wires being of such a size to fit the interior of the tubes. With this construction it will be seen that an electrical connection between the switch and the motor is established at any adjusted position of the motor-frame. The armature-shaft is supported by a suitable step-bearing, and preferably we place the step-bearing between the armature 5 and the fan 4.

Referring to Fig. 1, it will be seen that the upper end of the motor-frame is provided with a stationary cup-bearing member 40, having the exterior flange 41 and the inner concentric flange 42, the said flanges forming between them an annular oil-cup, in which rests the downturned flange 43 of a collar 44, which is fast on the armature-shaft. The flange 43 rests on the bottom of the annular chamber between the flanges 41 and 42 of the cup-bearing 40, and preferably the foot of the downturned flange 43 will contact with the outer flange 41 of the cup-bearing 40 to thereby center the armature-shaft, while the said downturned flange 43 is spaced from the inner flange 42 of the cup member, as shown in Fig. 1. The cup-bearing 40 has the central aperture 45 therein, through which the armature-shaft 4 projects, the said aperture being slightly larger than the armature-shaft, so that the shaft does not contact with the bearing, the downturned flange 43 serving to center the shaft and hold it in its proper position. Preferably the said downturned flange 43 will be provided with a series of apertures 46 therein, and in operation the annular chamber in the cup member 40 will be provided with a suitable lubricant. This construction of step-bearing is substantially the same as that illustrated and described in an application of Gardner C. Hawkins, Serial No. 44,564, filed January 24, 1901, and is such as to make it impossible for the oil to come in contact with the armature-shaft, for it will be readily seen that owing to the conical shape of the downturned flange 43 the centrifugal force will prevent the oil from working up on the outside of the flange to the smaller portion thereof, and since the said flange does not contact with the inner wall 42 of the cup-bearing no oil will work over the bearing down through the aperture 45. Any oil which tends to work up the inside of the flange 43 will be either forced down by the centrifugal force or will be thrown out through the apertures 46. We may, if desired, provide the bottom of the annular chamber in the oil-cup 40 with a wearing-washer 47. The step-bearing above described is designed to support the entire weight of the armature and the fan and also operates to center the upper end of the armature-shaft, so as to prevent the shaft from contacting with the bearing and also to prevent the armature from striking the field-coils. The lower end of the armature-shaft 4 is provided with a suitable centering device, said centering device being illustrated as an oil-cup 50, into which the lower end of said shaft 4 projects, the said oil-cup having means to engage said shaft circumferentially and center the same. The oil-cup 50 may be sustained by the motor-frame 6 and preferably is provided with the bulging or convex sides or walls 51, the bottom of said oil-cup having a socket 52, into which the end of the shaft projects, the said socket serving simply to center the shaft. A collar or flange 53 is fast on the armature-shaft, the said collar being so situated as to be just within the mouth of the oil-cup. Oil may be introduced into the cup through the duct 54, which extends through the motor-frame. With this construction it will be seen that any oil which works up the armature-shaft as far as the collar 53 will be thrown by centrifugal force out to the circumference of said collar and off from the same onto the wall 51 of the oil-cup 50, and because the circumferential velocity at the edge of the collar 53 is very much greater than on the surface of the shaft 4 it will be impossible for any oil to work up around the collar onto the commutator. The fan 3 comprises the convex disks 60 61, the said disk 61 having the central aperture 62 therein. A series of radially-arranged floats or partitions 63 divide the space between the disks 60 61 into radially-arranged passages, through which the air is forced as the fan is rotated, as will be obvious. A suitable fan-guard 65 is preferably supported upon the rods or supports 66, which are secured to the motor-frame 6. When the fan is set in motion, the air will be sucked in through the central opening 62 and forced out through the passages between the partitions 63, the column of air delivered from the fan having a substantially conical shape. It will be obvious, therefore, that by raising or lowering the fan the area affected by the fan may be varied, and hence it is possible to control the operation of the fan to a great extent by merely adjusting the motor-frame vertically with reference to the base 7.

Various changes may be made in the construction of the device without departing from the spirit of the invention.

Having described our invention, what we claim as new, and desire to secure by Letters Patent, is—

1. In an electric fan, a telescopic standard carrying at its upper end a motor having a vertically-arranged armature-shaft, means to clamp the sections of the standard together in any adjusted position, a fan secured to the upper end of said shaft, extensible conductors within the standard and connected to the motor, and a controller for the motor carried by said standard, the construction being such that the motor may be operated at any adjusted position of the standard.

2. In an electric fan, a standard, comprising a base and a motor-frame having a hollow stem, said stem being vertically adjustable in the base, a motor in said frame having a vertically-arranged armature-shaft, a fan attached to said shaft and telescopic electrical connections inclosed in the hollow stem and connected to the motor.

3. In an electric fan, a standard comprising a fixed base and a vertically-adjustable motor-frame, said frame having a hollow stem which telescopes into the base of the standard, a motor in said frame, and a fan operated by said motor, means to clamp said base and standard together to hold the fan at any desired vertical elevation, fixed terminals in said base and frame respectively, extensible electrical connections inclosed by said hollow stem and connecting the terminals in the base with those of the frame, and a controller in said base for regulating the speed of the fan.

4. In an electric fan, a standard comprising a fixed base and a motor-frame, said frame having a hollow stem which is vertically adjustable in the base, a motor in said frame, a fan operated by said motor, a switch in said base, and extensible electrical conductors inclosed by said hollow stem and connecting the switch and motor.

5. In an electric fan, a standard comprising a fixed base and a motor-frame having a hollow stem, said stem being vertically adjustable in said base, a motor in said frame, a fan operated by said motor, a resistance-coil and a switch in said base, and extensible conductors between the switch and motor whereby the motor may be operated at any adjusted position of the motor-frame.

6. In an electric fan, a standard comprising a base and a motor-frame having a hollow stem, said stem being vertically adjustable in said base, a motor in said frame having a vertically-arranged armature-shaft, a fan attached to said shaft, a switch in said base, and telescopic electrical connections inclosed in the hollow stem and connecting the switch and motor.

7. In an electric fan, a standard comprising a base and a motor-frame having a hollow stem, said stem being vertically adjustable in said base, a motor in said frame having a vertically-arranged armature-shaft, a fan attached to the upper end of said shaft, a switch in said base, and extensible electrical connections between said switch and motor and inclosed by said hollow stem, said connections comprising conductors fixed to the frame and base and having a sliding connection with each other.

8. In an electric fan, a standard comprising a base and a motor-frame having a hollow stem, said stem being vertically adjustable in said base, a motor in said frame having a vertically-arranged armature-shaft, a fan attached to the upper end of said shaft, a switch in said base, and extensible electrical connections between said switch and motor and inclosed by said hollow stem, said connections comprising tubes inclosed in said hollow stem, and wires attached to the base and telescoping in the said tubes.

9. In an electric fan, a motor having a vertically-arranged armature-shaft, a fan attached to said shaft at the upper end thereof, a step-bearing between the motor and fan for supporting the armature-shaft, said bearing comprising a stationary cup member having an aperture larger than the shaft and through which the shaft projects, and a collar fast on the shaft and having a depending flange which rests in the cup-bearing but is spaced from the inner wall thereof, and a centering device for the lower end of the shaft, said centering device comprising a vertical oil-cup with a closed bottom and into which the lower end of the shaft projects, said oil-cup engaging the shaft on the circumference thereof only.

10. In an electric fan, a motor having a vertically-arranged armature-shaft, a fan attached to the upper end of said shaft, a step-bearing between the fan and the motor for supporting said shaft, an oil-cup adapted to receive the lower end of the shaft and having means to center said shaft, and a collar or flange fixed to said shaft, said collar being smaller than and situated within the mouth of the oil-cup whereby oil is prevented from working up the armature-shaft past the collar.

11. In an electric fan, a standard comprising a base portion, and a motor-frame having a hollow stem, said stem being vertically adjustable in the base, a motor in said frame having a vertically-arranged armature-shaft, a fan attached to said shaft, said fan operating to deliver a current of air at an angle to its axis of rotation, and extensible electrical connections inclosed in said hollow stem, and a controller in the base of the motor, the said construction being such that by varying the height of the motor-frame the circular area affected by the fan may be increased or diminished.

In testimony whereof we have signed our names to this specification in the presence of two subscribing witnesses.

GARDNER C. HAWKINS.
HERBERT L. FLINT.

Witnesses:
LOUIS C. SMITH,
GEO. W. GREGORY.